United States Patent [19]

Mori et al.

[11] Patent Number: 4,597,543
[45] Date of Patent: Jul. 1, 1986

[54] LOCKING MECHANISM ADAPTED FOR USE IN WEBBING RETRACTOR

[75] Inventors: Shinji Mori; Keiichi Tamura, both of Aichi, Japan

[73] Assignee: Kabushiki Kaisha Toka-Rika-Denki-Seisakusho, Aichi, Japan

[21] Appl. No.: 570,909

[22] Filed: Jan. 16, 1984

[30] Foreign Application Priority Data

Jan. 27, 1983 [JP] Japan .................................. 58-10496

[51] Int. Cl.⁴ ........................ B60R 22/38; B65H 75/48
[52] U.S. Cl. ........................ 242/107.4 B; 242/107.4 A
[58] Field of Search .................. 242/107.4 B, 107.4 A; 280/806; 297/478

[56] References Cited

U.S. PATENT DOCUMENTS 3,937,416  2/1976  Henderson .............. 242/107.4 B X
3,985,314  10/1976 Booth ..................... 242/107.4 A
4,177,962  12/1979 Hildebrandt .............. 242/107.4 B
4,467,981  8/1984  Mori et al. ................ 242/107.4 A

FOREIGN PATENT DOCUMENTS 2454310  12/1980  France ........................ 242/107.4 B Primary Examiner—John M. Jillions
Attorney, Agent, or Firm—Sixbey, Friedman & Leedom

[57] ABSTRACT

In a locking mechanism for a webbing retractor in which a plurality of lock plates rotated together with a takeup shaft winding an occupant-restraining webbing are moved in tangential directions of the takeup shaft in an emergency situation of a vehicle and teeth portions of the lock plates come into mesh with an internal gear ratchet wheel, whereby a webbing-unwinding rotation of the takeup shaft is stopped, the teeth portion of one of the lock plates is disposed nearer to the internal gear ratchet wheel than the teeth portion of the other lock plate, so that the teeth portion of the one of the lock plates comes into mesh with the internal gear ratchet wheel earlier than the teeth portion of the other lock plate.

14 Claims, 3 Drawing Figures

LOCKING MECHANISM ADAPTED FOR USE IN WEBBING RETRACTOR

BACKGROUND OF THE INVENTION

1. Field of the Invention

The present invention relates to a locking mechanism adapted for use in a seatbelt system for protecting an occupant in an emergency situation of a vehicle and more particularly to a locking mechanism adapted for use in a webbing retractor winding an occupant-restraining webbing and, in the emergency situation, stopping an webbing-unwinding motion of the webbing retractor.

2. Description of the Prior Art

The webbing retractor is such constructed that the occupant-restraining webbing is wound on to a webbing takeup shaft and the locking mechanism is worked to stop a webbing-unwinding rotation of the takeup shaft in the emergency situation so that the occupant is put in his restrained situation.

The locking mechanism is constructed in such a manner that a lock plate is rotated together with the takeup shaft and is moved outwardly in a tangential direction of the takeup shaft to be caused to engage with an internal gear ratchet wheel, whereby the webbing retractor can be made small-sized.

Also, a plurality of lock plates can be arranged centering around the axial center of the takeup shaft, whereby it is expected that the webbing-unwinding rotation of the takeup shaft is stopped securely.

However, in case that the plurality of lock plates are disposed about the takeup shaft, it is difficult due to tolerance in manufacture or the like that each of the teeth portions of the respective lock plates moved outwardly in tangential directions of the takeup shaft in the emergency situation comes surely into mesh with the internal gear ratchet wheel at its predetermined position. Accordingly, a mechanism causing the teeth portions of every lock plates to engage with the internal gear ratchet wheel has been expected in this field.

SUMMARY OF THE INVENTION

In view of the above fact, the present invention has as its object the provision of a locking mechanism adapted for use in a webbing retractor wherein the lock plates are caused to engage with the internal gear ratchet wheel rapidly in the emergency situation of the vehicle, so that the webbing-unwinding rotation of the takeup shaft is stopped and simultaneously therewith the lock plates are capable of enduring a large webbing tension.

In the locking mechanism according to the present invention, one of the teeth portions of the plural lock plates is arranged nearer to the internal gear ratchet wheel than that of the other lock plate and thereby the one is first caused to engage with the internal gear ratchet wheel in the emergency situation of the vehicle, so that the webbing-unwinding rotation of the takeup shaft is stopped rapidly and at the time of further increase in webbing tension the teeth portion of the other lock plate is also caused to engage with the internal gear ratchet wheel owing to deformation of the takeup shaft and the like, thereby bearing a large webbing tension surely.

Description will hereinunder be given of an embodiment of the present invention with reference to the attached drawings.

DESCRIPTION OF THE PREFERRED EMBODIMENT

Figure 1:
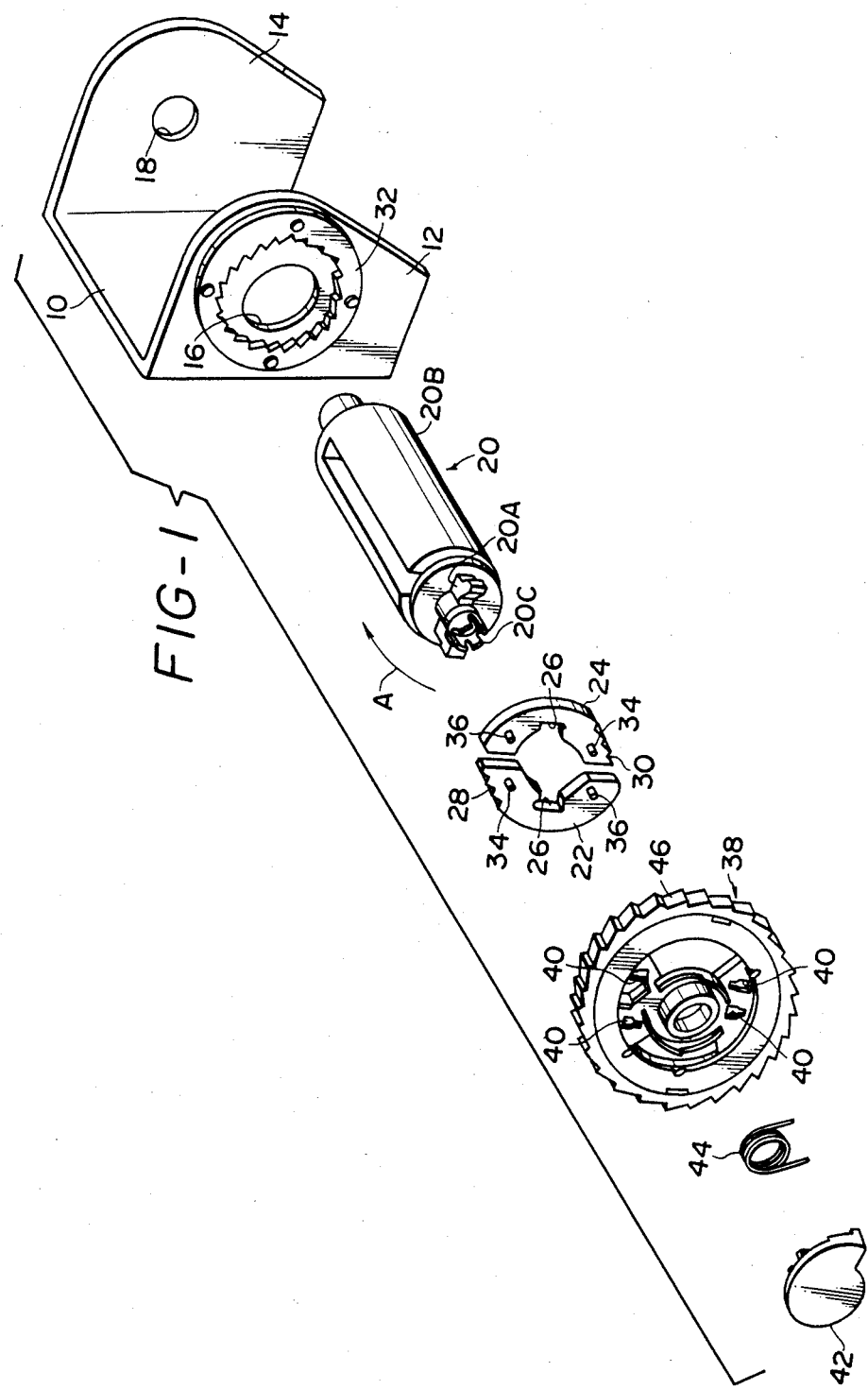
FIG. 1 is a disassembled perspective view showing a webbing retractor to which a locking mechanism according to the present invention is applied.

FIG. 1 shows one embodiment of a webbing retractor to which a locking mechanism according to the present invention is applied. The webbing retractor is fixed at its frame 10 to a vehicle body through a fitting bolt (not shown). A pair of leg plates 12 and 14 extend from both the side portions of the frame 10 in parallel with each other and they have shaft-supporting holes 16 and 18 coaxial to each other.

Inserted to the holes 16 and 18 is a takeup shaft 20 which is rotatably supported to the frame 10. Fixed to the takeup shaft 20 is one end of an occupant-restraining webbing (not shown). The webbing is wound, or retracted, in layers on to the takeup shaft 20 by a biasing force and a tongue-plate fixed to the other end of the webbing is locked to a buckle device mounted on the vehicle body, whereby an intermediate portion of the webbing can be fastened by an occupant.

The takeup shaft 20 comprises a core bar 20A made of a thick plate material and a synthetic resin layer 20B formed about the core bar 20A integrally therewith and is formed in a cylindrical shape. One end portion of the core bar 20A extends from one end portion of a longitudinal direction of the synthetic resin layer 20B and a pair of lock plates 22 and 24 are fitted to the one end portion of the core bar 20A. That is to say, the lock plates 22 and 24 are respectively formed at their central portions with substantially U-shaped recess portions 26, whereby the general configuration of each of the lock plates 22 and 24 is of a substantial C-shape. The core bar 20A is inserted into the recess portions 26, and the lock plates 22 and 24 are rotatable together with the takeup shaft 20.

Formed between each of the recess portions 26 and the one end portion of the core bar 20A inserted in the recess portions 26 is a slight clearance, so that the lock plates 22 and 24 are rotatable relative to the takeup shaft 20 by a predetermined angle.

The respective lock plates 22 and 24 are formed at their one end portions with teeth portions 28 and 30 which are opposed to an internal gear ratchet wheel 32 fixed to the leg plate 12.

In this connection, the size of the lock plate 22 is made larger than that of the lock plate 24, so that the teeth portion 28 is positioned nearer to the internal gear ratchet wheel 32 than the teeth portion 30.

Figure 2:
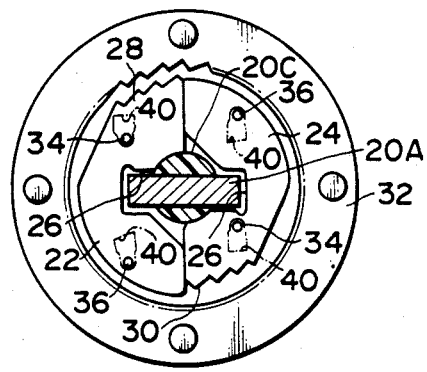
FIG. 2 is a front view showing arrangements of lock plates and an internal gear ratchet wheel in an ordinary situation of a vehicle.

In addition, the respective lock plates 22 and 24 are formed projectingly with a pair of pins 34 and 36 which are received in slots 40 formed in a locking wheel 38. The locking wheel 38 is rotatably supported to a small diameter axial portion 20C extending from the one end portion of the core bar 20A. Also, confined between the locking wheel 38 and a holder 42 fixed to the tip end of the small diameter axial portion 20C is a coil spring 44, whereby the locking wheel 38 is always biased rotatably in a webbing-unwinding direction of the takeup shaft 20 (in a direction of arrow A in FIG. 1). Accordingly, the locking wheel 38 receives the pins 34 and 36 of the lock plates 22 and 24 in one end portions of the slots 40 by the biasing force of the coil spring 44, as shown in FIG. 2, so that the teeth portions 28 and 30 are separated from the internal gear ratchet wheel 32. However, when the takeup shaft 20 is rapidly rotated in a webbing-unwinding direction, a lag in rotation of the locking wheel 38 relative to the takeup shaft 20 occurs against the biasing force of the coil spring 44, and at the time of the lag the lock plates 22 and 24 are movably guided in longitudinal directions of the slots 40, that is, the teeth portions 28 and 30 of the lock plates 22 and 24 are guided in directions of approach to the internal gear ratchet wheel 32, respectively.

Figure 3:
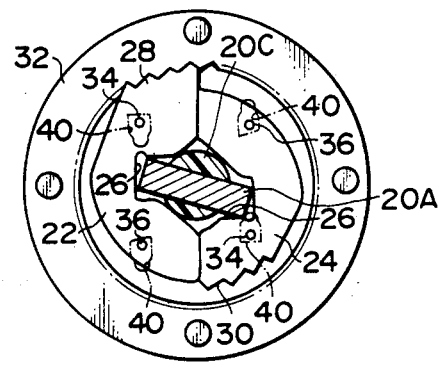
FIG. 3 is an operational view of FIG. 2 showing the condition that a relatively low webbing tension acts upon a takeup shaft.

As is understood from FIGS. 2 and 3, the teeth portion 28 of the lock plate 22 is disposed nearer to the internal gear ratchet wheel 32 than the teeth portion 30 of the lock plate 24 and, therefore, the teeth portion 28 comes into mesh with the internal gear ratchet wheel 32 earlier than the teeth portion 30 in the emergency situation of the vehicle.

Description will now be given of operation of the embodiment according to the present invention.

In the ordinary running situation of the vehicle, when the occupant fastening the webbing changes his attitude, the takeup shaft 20 is rotated by the unwinding and the winding of the webbing. However, such a rotation of the takeup shaft 20 is effected at a relatively low acceleration and, therefore, the locking wheel 38 is rotated in accordance with the rotation of the takeup shaft 20. That is to say, the relative rotation of the locking wheel 38 to the takeup shaft 20 does not occur.

When the vehicle is in such an emergency situation as needs an urgent braking operation, the occupant is moved urgently in the running direction of the vehicle and the webbing is rapidly unwound from the takeup shaft 20, so that the takeup shaft 20 is also rotated rapidly in the webbing unwinding direction. Accordingly, the lag in rotation of the locking wheel 38 relative to the takeup shaft 20 occurs, which results in that the pins 34 and 36 are moved within the slots 40, i.e., the lock plates 22 and 24 are moved in the tangential directions of the takeup shaft 20, as shown in FIG. 3, whereby the teeth portion 28 of the lock plate 22 comes into mesh with the internal gear ratchet wheel 32 earlier than the teeth portion 30 of the lock plate 24. Thus, the teeth portion 28 is capable of engaging with the internal gear ratchet wheel 32 steadily. At this time the teeth portion 30 is still separated from the internal gear ratchet wheel 32 and, therefore, it does not prevent the teeth portion 28 from engagement with the internal gear ratchet wheel 32.

Next, when a large deceleration acts upon the vehicle, for example, at a time of vehicle collision, the occupant is urgently thrown out in the direction of the collision, so that a relatively large force acts on the takeup shaft 20 in the webbing-unwinding direction. The force acts as a force causing the core bar 20A to rotate in the clockwise direction shown in FIG. 3. As a result, the synthetic resin layer 20B is deformed in the takeup shaft 20 and the core bar 20A is rotated clockwisely centering around the vicinity of a contact portion between the core bar 20A and the lock plate 22, whereby the lock plate 24 is moved in the tangential direction of the takeup shaft 20 to cause the teeth portion 30 to engage with the internal gear ratchet wheel 32. Thus, both the teeth portions 28 and 30 come into mesh with the internal gear ratchet wheel 32, so that the core bar 20A is firmly prevented from rotating in the clockwise direction and the occupant is put in a securely restrained situation to be protected safely.

It is preferable that the deformation of the takeup shaft 20 occurs when the webbing tension reaches 100 kg or more.

Additionally, in case that the locking wheel 38 is formed at its outer periphery with a ratchet wheel 46 with which an acceleration sensor (not shown) detecting acceleration and deceleration of vehicle comes into mesh in the emergency situation of the vehicle, the webbing-unwinding rotation of the locking wheel 38 is stopped, so that the webbing-unwinding rotation of the takeup shaft 20 is capable of being stopped more rapidly.

In the above embodiment a pair of lock plates are provided in the webbing retractor. However, the present invention is capable of being applied to a webbing retractor provided with three or more lock plates and the supporting means for supporting the lock plates to the takeup shaft is not limited to the structure shown in the above embodiment.

What is claimed is:

1. A locking mechanism for a webbing retractor used in a seatbelt system protecting an occupant in an emergency situation of a vehicle, comprising:
   (a) a frame mounted on a vehicle body;
   (b) a takeup shaft rotatably supported to the frame and winding an occupant-restraining webbing;
   (c) lock means disposed between the frame and the takeup shaft and including an internal gear wheel fixed to the frame and a plurality of lock plates supported to the takeup shaft and rotated together with the takeup shaft, said lock plates having teeth portions and being guided by a locking wheel rotated by a predetermined biasing force in accordance with the rotation of the takeup shaft, whereby the lock plates are capable of separation from and approach to the internal gear wheel, the lock plates being separated from the gear wheel in an ordinary running situation of the vehicle, and in the emergency situation of the vehicle the teeth portions of the lock plates coming into mesh with the internal gear wheel to stop rotation of the takeup shaft, the teeth portion of one of the lock plates being disposed nearer to the internal gear wheel than the teeth portion of the other lock plate to be caused to come into mesh with the internal gear wheel earlier than the teeth portion of the other lock plate, the teeth portion of the said other lock plate coming into mesh with the internal gear by deformation of the takeup shaft when a large tension acts upon the webbing in an emergency situation of the vehicle; and
   (d) acceration-responsive means causing the lock plates to come into mesh with the internal gear wheel in the emergency situation of the vehicle.

2. A locking mechanism as set forth in claim 1, wherein the takeup shaft includes a core bar and a synthetic resin layer formed thereabout, and the synthetic resin layer is deformed when a large load acts thereupon, whereby the teeth portion of the other lock plate is caused to come into mesh with the internal gear wheel.

3. A locking mechanism as set forth in claim 2, wherein the core bar is provided with a projection extending from one end of a longitudinal direction of the synthetic resin layer and the projection is applied as a fitting portion of the lock plates.

4. A locking mechanism as set forth in claim 3, wherein the projection of the core bar is of a thick plate shape, to which recess portions formed in central portions of the lock plates are opposed, whereby the lock plates are mounted on to the takeup shaft.

5. A locking mechanism as set forth in claim 4, wherein a slight clearance is provided between each of the recess portions and the core bar, whereby the lock plates are rotatable relative to the takeup shaft by a predetermined angle.

6. A locking mechanism as set forth in claim 3, wherein the projection is formed projectingly with a small diameter axial portion in line with the center axis of the takeup shaft and the locking wheel is supported to the small diameter axial portion.

7. A locking mechanism as set forth in claim 6, wherein the small diameter axial portion acts as a detent against the direction of separation of the lock plates from the internal gear wheel.

8. A locking mechanism as set forth in claim 6, wherein the small diameter axial portion is provided with a holder and an elastic body giving a biasing force to the locking wheel is confined between the holder and the locking wheel.

9. In a locking mechanism applied to a webbing retractor in which teeth portions of a plurality of lock plates rotated together with a takeup shaft winding an occupant-restraining webbing thereon come into mesh with an internal gear wheel in an emergency situation of a vehicle to thereby stop a webbing-unwinding rotation of the takeup shaft; the improvement wherein the teeth portion of one of the lock plates is disposed nearer to the internal gear wheel than that of the other lock plate, whereby the said one of the lock plates comes into mesh with the internal gear wheel earlier than the other lock plate in the emergency situation of the vehicle, the teeth portion of the other lock plate coming into mesh with the internal gear wheel by deformation of the takeup shaft when a large tension acts upon the webbing in said vehicle emergency situation.

10. A locking mechanism as set forth in claim 9, wherein the takeup shaft includes a core bar and a synthetic resin layer formed thereabout, and the synthetic resin layer is deformed when a large load acts thereupon, whereby the teeth portion of the other lock plate is caused to come into mesh with the internal gear wheel.

11. A locking mechanism as set forth in claim 10, wherein the core bar is provided with a projection extending from one end of a longitudinal direction of the synthetic resin layer and the projection is applied as a fitting portion of the lock plates.

12. A locking mechanism for a webbing retractor used in a seatbelt system, comprising:
 (a) a frame fixed to a vehicle body and having a pair of leg plates extending from both the side portions thereof in parallel with each other;
 (b) a takeup shaft winding an occupant-restraining webbing, the takeup shaft including a core bar and a synthetic resin layer formed thereabout and the synthetic resin layer being rotatably supported to the leg plates;
 (c) an internal gear wheel fixed to one of the leg plates;
 (d) a locking wheel supported to the takeup shaft coaxially therewith;
 (e) spring means causing the locking wheel to rotate in accordance with rotation of the takeup shaft and allowing a lag in rotation of the locking wheel relative to the takeup shaft in an emergency situation of a vehicle; and
 (f) a plurality of lock plates supported to the takeup shaft, rotated together with the takeup shaft and capable of rotation relative to the takeup shaft by a predetermined amount, the lock plates being guided by the locking wheel so that teeth portions of the lock plates are capable of separation from and approach to the internal gear wheel, the teeth portions of the locking plates coming into mesh with the internal gear wheel when a lag in rotation of the locking wheel occurs relative to the takeup shaft, and the teeth portion of one of the lock plates being disposed nearer to the internal gear wheel than the teeth portion of the other lock plate, whereby the teeth portion of the one of the lock plates comes into mesh with the internal gear wheel earlier than the teeth portion of the other lock plate at the time of the lag in rotation of the locking wheel and thereafter the teeth portion of the other lock plate comes into mesh with the internal gear wheel due to deformation of the takeup shaft when a webbing-unwinding force acts upon the takeup shaft in an amount of more than a predetermined value.

13. A locking mechanism as set forth in claim 12, wherein the core bar is provided with a projection extending from one end of a longitudinal direction of the synthetic resin layer and the projection is applied as a fitting portion of the lock plates.

14. A locking mechanism as set forth in claim 12, wherein the projection of the core bar is of a thick plate shape, to which recess portions formed in central portions of the lock plates are opposed, whereby the lock plates are mounted on to the takeup shaft.

* * * * *